Sept. 15, 1970  G. G. HASELDEN  3,528,783
MULTILAYER CATALYTIC REACTOR
Filed June 14, 1965  2 Sheets-Sheet 1

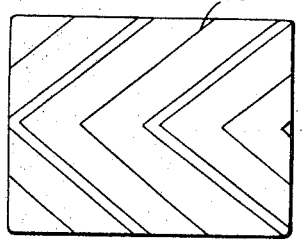
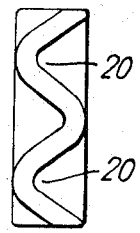
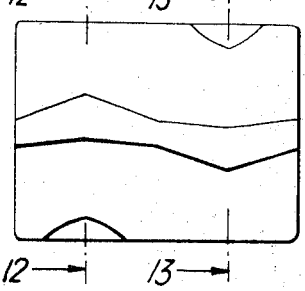

United States Patent Office 3,528,783
Patented Sept. 15, 1970

3,528,783
MULTILAYER CATALYTIC REACTOR
Geoffrey Gordon Haselden, Leeds, England, assignor to Marston Excelsior Limited, Wolverhampton, England, a British company
Filed June 14, 1965, Ser. No. 463,630
Claims priority, application Great Britain, June 16, 1964, 24,925/64
Int. Cl. B01j 9/04
U.S. Cl. 23—288                                11 Claims

ABSTRACT OF THE DISCLOSURE

This invention provides a chemical reactor or like process vessel of multilayer or sandwich construction, built-up in a stack from a pile of individual plates which are secured together but spaced from one another by means of bent marginal flanges on the plates. The plates are maintained parallel and are of substantially equal area whereby the spaces between them provide separated chambers of generally equal extent in area each of which is bounded above and below by generally parallel walls provided by the surfaces of the adjacent plates. Some chambers in the stack contain catalyst, adsorbent or like solid process material, held under compression by the plates, and other chambers constitute channels for flow of heat transfer medium, each catalyst chamber being sandwiched between two heat transfer chambers.

Figure 1:
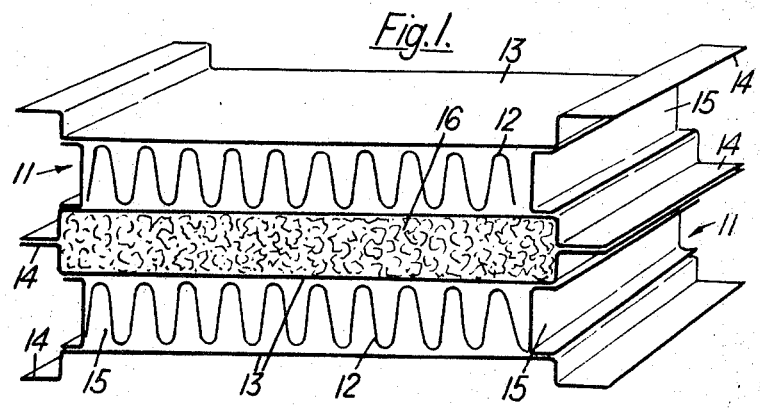

Appropriate header connections are made to the various chambers. In the preferred embodiments, the catalyst or other solid process material is prepared in the form of similarly shaped elements that can be set all with the same orientation in the catalyst chambers thereby to give advantageous flow and heat transfer characteristics.

This invention relates to chemical reactors and like vessels, and especially to reactors of the type in which the desired reaction takes place in the presence of a solid catalyst packed within the reactor vessel.

In many chemical reactors in which gaseous or liquid systems are reacted in contact with a solid catalyst there is either a generation or an absorption of heat. In such processes it is often vital to maintain the reactants at a closely specified temperature and then it is necessary to provide means for removing or adding heat during the process according to whether the reaction is exothermic or endothermic. As a typical example may be mentioned the production of ethylene oxide by the oxidation of ethylene; in this reaction, which is exothermic, a good yield of the desired product can only be obtained if the heat can be removed at a sufficient rate to prevent the temperature rising above a critical level, as otherwise most of the ethylene is simply decomposed to form carbon dioxide and steam.

The form of reactor construction normally adopted in these cases comprises a bundle of straight tubes mounted between tube-plates in a cylindrical shell. The catalyst, in the form of closely sieved granules or regular shaped pellets, is carefully packed in the tubes the amount in each tube being adjusted to ensure that the pressure drop across every tube, at equal flow, lies between close limits. End covers enclosing the tube plates enable the materials to be reacted to be passed through the tubes. For removing heat from, or adding heat to, a reaction proceeding inside the tubes a heat transfer medium circulates in the shell around the tubes. The tube diameter used can seldom be more than 2–3 inches because a radial temperature gradient will develop due to the low effective thermal conductivity of the packed catalyst. Therefore, for a large reactor many hundreds or even thousands of individually packed tubes must be used, leading to high cost. Even so, the chemical yield may be well below optimum due to the temperature gradients and variations in the residence time of the reactants within individual tubes and between the different tubes of the bundle.

Occasionally the heat transfer medium is circulated in the tubes and the catalyst is packed in the shell around the tubes, but then it is even more difficult to ensure uniformity of flow and temperature. Also renewal of the catalyst is more difficult in this case.

It is accordingly an object of the invention to provide an improved reactor design in which a greater degree of temperature uniformity can be secured within the catalyst bed despite high rates of heat transfer. It is a further object to achieve a closer control of the residence time during which the materials are in contact with the catalyst.

According to the present invention a chemical reactor (or like vessel) is made of multilayer or sandwich construction; some of the layers of the sandwich can contain the catalyst and others can constitute channels for flow of the heat transfer medium, with substantially flat metal plates separating the catalyst layers from the heat transfer channels. Generally, the catalyst and the heat transfer medium will occupy alternate layers but the invention also includes form of construction where there is more than one heat transfer channel for each catalyst channel.

With the arrangement according to the invention improved thermal performance and more uniform residence time are possible because: (a) it is practically and economically feasible to use layers of catalyst having thicknesses less than the tube diameters in present reactors, (b) the catalyst may be installed in an orientated manner rather than as random packing, with catalyst elements of a form to give a good heat conduction path to the bounding plates, and with flow paths between the catalyst elements designed to encourage a flow interchange as between the centres and the outside of the catalyst channels and thereby promote heat transfer between the fluid in the catalyst channels and the bounding plates.

In the preferred method of construction, the multilayer reactor is built up by stacking the component layers one upon another until a block of the desired size is reached. The heat transfer channels can be made up as prefabricated units and then the reactor can be built by stacking up these units with intervening layers of catalyst.

Figure 2:
Figure 3:
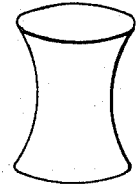
Figure 4:
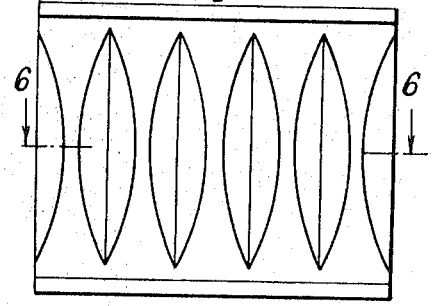
Figure 5:
Figure 6:
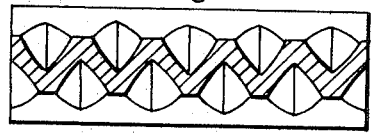

Various forms of construction in accordance with the invention will now be described by way of example, reference being had to the accompanying drawings in which:

FIG. 1 is a perspective diagram illustrating the build-up of a reactor according to the invention, FIGS. 2 and 3 are examples of special packing elements that can be used in the reactor, FIGS. 4 and 5 are a plan and an end elevation, respectively, of another form of packing element, FIG. 6 is a view in section on the line 6—6 of FIG. 4, FIGS. 7, 8 and 9 are a plan, an end elevation and a side elevation, respectively, of a further form of packing element, FIGS. 10 and 11 are a plan and an end elevation, respectively, of yet another form of packing element, and FIGS. 12 and 13 are, respectively, sections on the lines 12—12 and 13—13 of FIG. 10.

In one typical method illustrated in FIG. 1, panels to act as channels for a heat transfer medium are first made, each panel 11 being fabricated by brazing a corrugated metal matrix 12 between a pair of flat metal plates 13 with offset marginal flanges 14. The side edges of the panel are sealed by channel pieces 15 and connections (not shown) are provided to enable the heat transfer medium to enter and leave. Normally a large number of these heat transfer panels will be fabricated at one time.

To build up a reactor one of the prefabricated heat transfer panels 11 is placed down flat and a layer of catalyst 16 is spread over it. Then a second heat transfer panel is laid on top, followed by further layers of catalyst and further panels, alternately, until the required flow area or volume of catalyst has been achieved. The stack is then placed under compression by clamps to hold the catalyst in place, and the side edges of the catalyst chambers are sealed by attaching separate metal edge strips, or by welding or otherwise bonding together the aforementioned flanges 14 at the side edges of the panels 11. The clamps may be left permanently in place, or they may be removed if the edge seals are sufficiently sturdy or robust to maintain the required compression of the catalyst chambers. The edges of the catalyst layers through which the reactants are to enter and leave must not, of course, be sealed but they may be covered by a gauze or other porous barrier to keep the catalyst in place.

The reactor is completed by coupling the connections of the heat transfer panels to appropriate manifolds, and attaching header boxes for delivering the reactant feed to, and collecting the product flows from, the catalyst chambers.

The catalyst may be in the form of a granular solid, in which case it is carefully spread to a uniform thickness. It may be convenient for low rims to be provided on the heat transfer panels to help retain the catalyst during the spreading and stacking operations. Preferably, however, the catalyst is prepared as uniform or approximately uniform elements or pellets of a particular shape that can be orientated in a desired manner and FIGS. 2 to 13 illustrate various shapes of catalyst pieces that can be substituted for the granular catalyst 16 in FIG. 1. One possible shape is cylindrical; the cylinder length can be equal to the width of an individual catalyst chamber, the flat end faces of the cylinder being in contact with the surfaces of the bounding panel plates above and below. To maintain a regular spacing between the cylindrical catalyst pellets an adhesive may be used between the pellets and the bounding panel plates. However, if the pellets are made in barrel shape or Diabolo shape as shown respectively in FIGS. 2 and 3, instead of straight cylindrical, they can be closepacked in contact with one another.

Another possibility, especially with ceramic-based catalysts, is to extrude or otherwise form the catalyst into long elements of uniform width equal to the width of a catalyst chamber. These elements are then assembled with their axes generally in the direction of flow. The cross-sectional shape and thickness of these elements can be designed to give the desired flow profile and exposed surface area, and they can also be shaped for close-packing. Long extruded catalyst elements have a number of special advantages; they are easy to handle, and their cross-sectional shapes can be closely controlled in manufacture so that uniformly correct flow areas in the catalyst chambers are readily attainable. And whereas it may be advantageous to give the flow-bounding catalyst surfaces a prescribed degree of "roughness" this can be easily provided for in the extrusion process by, for example, running the extruded material between a pair of indenting wheels. A typical example of catalyst material made in this way is illustrated in FIGS. 4 to 6.

There are a number of measures that may be adopted for promoting heat transfer between the catalyst and the bounding panels of the catalyst chamber. If desired, the panels can be finned to improve thermal contact with the catalyst. When the catalyst consists of an active layer deposited on a rigid base or carrier the base material can be chosen to have a high thermal conductivity. Mention has already been made of using an adhesive for attaching the catalyst elements to the bounding panels when it is necessary to hold the elements at the correct spacing. But even when the elements do not require to be held positionally in this way, for example when they are close-packed, it may still be advantageous to employ a bonding agent or sealant between the elements and the panels to reduce the thermal contact resistance.

Another way of enhancing heat transfer is to produce a flow interchange between the middle of the catalyst chamber and the outsides. In other words the transfer of heat directly between the fluid in the catalyst chamber and the bounding walls is promoted rather than conduction of heat through the catalyst elements. That means that becomes advantageous, when this technique is employed, to keep the contact areas between the catalyst elements and the bounding walls reasonably small so as to allow direct access of the fluid to large areas of the walls.

FIGS. 7 to 9 show one form of extruded or pelleted catalyst element designed to obtain this effect. The element has flat-peaked corrugations producing troughs 20 which, in plan, are generally in the form of chevrons, and when packed the elements are laid one upon another with the chevrons of each succeeding element reversed in relation to those of the element below. Fluid travelling along the catalyst chamber, in a path generally parallel to the axes of the elements, passes outwardly from the centre to the sides of the catalyst chamber along the troughs of one element and then back toward the centre along the troughs of the element immediately above or below. In this case the catalyst is designed to have a small area of contact with the bounding plates, direct contact and heat transfer between he reactants and the bounding wall being promoted.

FIGS. 10 to 13 illustrate another form of catalyst element of more complex configuration in which the cross section is first cruciform (FIG. 11), changes progressively along the axis of the element to something approaching a deformed or tilted Z (FIG. 12), then back to cruciform then to the Z form tilted the opposite way (FIG. 13) and finally to cruciform again. This produces flow passages each of which changes in cross section along the length of the element in such a way that there is a degree of shift of the centre of gravity of the fluid mass to and fro between the middle and the outside of the catalyst chamber; or in other words the fluid is squeezed to and fro laterally as it progresses longitudinally of the chamber.

As a variant of the stacking technique previously described above for manufacturing the reactor, in some cases where the catalyst is a metal, or a derivative of a metal, that can be brazed or similarly fixed to the bounding metal sheets of the catalyst chambers, it can be incorporated as a corrugated matrix of the appropriate material built into the reactor block by standard metal fabrication techniques or modifications thereof. The catalyst chambers will then normally require some activation treatment after the reactor block has been built. Instances of this construction could arise with nickel, silver or iron catalysts.

The sandwich form of construction according to the invention permits the catalyst to be replaced by separation of the layers in the sandwich. If a reaction is to be carried out at high pressure the sandwich reactor block can be housed in a cylindrical metal shell.

While the invention has been illustrated by description of the fabrication of a reactor block with alternate single heat transfer chambers and catalyst chambers, it has already been mentioned that a reactor with several heat transfer chambers between consecutive catalyst chambers is within the scope of the invention. One or more of these several chambers could, if desired, have the reactant feed flow or the product flow passed therethrough. Also, the construction technique is not limited in its usefulness to chemical reactors but may with advantage be applied to other types of vessel, such as some forms of adsorber in which thermal cycling is used for regeneration. In that case the adsorbent or molecular sieve takes the place of the catalyst.

I claim:

1. A multichannel chemical process vessel of multilayer sandwich construction, comprising at least six individual plates piled one above another in spaced parallel relationship to form an open stack in which each succeeding plate in the stack is spaced over its whole area by a uniform distance from the plate that precedes it in the stack except at opposed margins where the plates are secured together, the plates being all of substantially equal area whereby the spaces between them provide at least five fully separated chambers all coextensive in area and plan each of which chambers is of generally uniform width and bounded above and below by parallel walls provided by the respective upper and lower surfaces of two consecutive plates in the stack, and wherein at least two of said generally equal area uniform width chambers in the stack contain solid process material, and others of said generally equal area uniform width chambers constitute channels for flow of heat transfer medium which medium does not have access to the solid process material chambers, each of said at least two solid process material chambers being sandwiched between heat transfer chambers.

2. A vessel according to claim 1, wherein the plates clamp the solid process material in the solid process material chambers under compression.

3. A vessel according to claim 1, wherein the solid process material chambers and the chambers for heat transfer medium alternate.

4. A vessel according to claim 1, wherein there is more than one chamber for heat transfer medium between consecutive solid process material chambers.

5. A vessel according to claim 1, wherein a corrugated metal matrix is provided in each heat transfer chamber.

6. A reactor according to claim 1, wherein the solid process material is catalyst in elongated element form and disposed in the solid process material chambers with the sides of the elongated elements against said bounding parallel walls and their longitudinal axes extending in the general direction of flow in the chamber.

7. A reactor according to claim 1, wherein the solid process material is a metallic catalyst incorporated in the solid process material chambers of the stack in the form of a corrugated matrix.

8. A chemical process vessel of multilayer sandwich construction, comprising a stack built up from a pile of individual plates which are secured together in the stack but spaced from one another, the plates being generally alike and parallel and of substantially equal area whereby the spaces between them provide a plurality of fully separated chambers of generally equal extent in plan each of which chambers is bounded above and below by generally parallel walls provided by the respective upper and lower surfaces of two consecutive plates in the stack, and wherein some of said plurality of generally equal chambers in the stack contain solid process material and others of said plurality of generally equal chambers constitute channels for flow of heat transfer medium, which medium does not have access to the solid process material chambers, each solid process material chamber being sandwiched between heat transfer chambers, and the solid process material being catalyst in cylindrical element form with end faces of the elements affixed to said bounding parallel walls of the solid process material chambers so that the cylinders are maintained in spaced relationship.

9. A chemical process vessel of multilayer sandwich construction, comprising a stack built up from a pile of individual plates which are secured together in the stack but spaced from one another, the plates being generally alike and parallel and of substantially equal area whereby the spaces between them provide a plurality of fully separated chambers of generally equal extent in plan each of which chambers is bounded above and below by generally parallel walls provided by the respective upper and lower surfaces of two consecutive plates in the stack, and wherein some of said plurality of generally equal chambers in the stack contain solid process material and others of said plurality of generally equal chambers constitute channels for flow of heat transfer medium, which medium does not have access to the solid process material chambers, each solid process material chamber being sandwiched between heat transfer chambers, the solid process material being catalyst in barrel-shaped element form with end faces of the elements continuous with said bounding parallel walls of the solid process material chambers, and their peripheral portions of greatest diameter in mutual contact.

10. A chemical process vessel of multilayer sandwich construction, comprising a stack built up from a pile of individual plates which are secured together in the stack but spaced from one another, the plates being generally alike and parallel and of substantially equal area whereby the spaces between them provide a plurality of fully separated chambers of generally equal extent in plan each of which chambers is bounded above and below by generally parallel walls provided by the respective upper and lower surfaces of two consecutive plates in the stack, and wherein some of said plurality of generally equal chambers in the stack contain solid process material and others of said plurality of generally equal chambers constitute channels for flow of heat transfer medium, which medium does not have access to the solid process material chambers, each solid process material chamber being sandwiched between heat transfer chambers, the solid process material being catalyst in Diabolo-shaped element form with end faces of the elements contiguous with said bounding parallel walls of the solid process material chambers and their peripheral portions of greatest diameter in mutual contact.

11. A chemical process vessel of multilayer sandwich construction, comprising a stack built up from a pile of individual plates which are secured together in the stack but spaced from one another, the plates being generally alike and parallel and of substantially equal area whereby the spaces between them provide a plurality of fully separated chambers of generally equal extent in plan each of which chambers if bounded above and below by generally parallel walls provided by the respective upper and lower surfaces of two consecutive plates in the stack, and wherein some of said plurality of generally equal chambers in the stack contain solid process material and others of said plurality of generally equal chambers constitute channels for flow of heat transfer medium, which medium does not have access to the solid process material chambers, each solid process material chamber being sandwiched between heat transfer chambers, the solid process material being catalyst in elongated element form and disposed in the solid process material chambers with the sides of the elongated elements against said bounding parallel walls and their longitudinal axes extending in the general direction of flow in the chamber, and the elongated catalyst elements being formed with a pattern shape repeated along their length and which causes movement of fluid flowing in each catalyst chamber alternately away from and toward said bounding parallel surfaces as the fluid progresses along the chamber.

(References on following page)

References Cited

UNITED STATES PATENTS

| | | | |
|---|---|---|---|
| 3,100,140 | 8/1963 | Ashley et al. | |
| 2,887,456 | 5/1959 | Halford et al. | |
| 2,664,340 | 12/1953 | Houdry | 252—477 |
| 2,644,800 | 7/1953 | Mottern et al. | 23—288 |
| 2,408,164 | 9/1946 | Foster | 252—477 |
| 1,043,580 | 11/1912 | Eldred | 23—288.9 |
| 3,295,919 | 1/1967 | Henderson et al. | 23—2 |
| 3,289,750 | 12/1966 | Valyi | 165—110 |

JAMES H. TAYMAN, JR., Primary Examiner

U.S. Cl. X.R.

23—2; 165—166; 252—477